United States Patent
Ficara et al.

(10) Patent No.: US 12,411,202 B2
(45) Date of Patent: Sep. 9, 2025

(54) ESTIMATING POSITION FROM REFERENCE SIGNALS RECEIVED BY COORDINATING ACCESS POINTS

(71) Applicant: Cisco Technology, Inc., San Jose, CA (US)

(72) Inventors: Domenico Ficara, Essertines-sur-Yverdon (CH); Pascal Thubert, Roquefort les Pins (FR); Jerome Henry, Pittsboro, NC (US); Amine Choukir, Lausanne (CH); Brian Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 387 days.

(21) Appl. No.: 18/065,871

(22) Filed: Dec. 14, 2022

(65) Prior Publication Data

US 2024/0201306 A1    Jun. 20, 2024

(51) Int. Cl.
*G01S 5/00* (2006.01)
*G01S 5/02* (2010.01)
*H04J 3/06* (2006.01)

(52) U.S. Cl.
CPC ........ *G01S 5/0036* (2013.01); *G01S 5/02216* (2020.05); *H04J 3/0661* (2013.01)

(58) Field of Classification Search
CPC .............................. G01S 5/0036; G01S 5/0063
See application file for complete search history.

(56) References Cited

U.S. PATENT DOCUMENTS

| | | | |
|---|---|---|---|
| 2014/0185520 A1* | 7/2014 | Gao | H04W 64/00 370/328 |
| 2015/0094103 A1* | 4/2015 | Wang | H04W 52/0254 455/456.6 |
| 2015/0099538 A1 | 4/2015 | Wang et al. | |

(Continued)

OTHER PUBLICATIONS

International Search Report and Written Opinion for International Application No. PCT/US2023/079909, dated Mar. 25, 2024, 14 pages.

(Continued)

*Primary Examiner* — Barry W Taylor
(74) *Attorney, Agent, or Firm* — Polsinelli P.C.

(57) ABSTRACT

Disclosed are systems, apparatuses, methods, and computer-readable media for identifying a location of a wireless device. A method for identifying a location of a wireless device includes transmitting a request message to the wireless device for identifying a position of the wireless device; receiving a response message from the wireless device; determining first time information based on a time of flight (ToF) of the request message and the response message, wherein the ToF corresponds to a distance of the wireless device from the AP; receiving a second message from a second AP that includes second time information associated with the request message and the response message; receiving a third message from a third AP that includes third time information associated with the request message and the response message; and transmitting location configuration information to the wireless device for the wireless device to determine a position of the wireless device.

20 Claims, 8 Drawing Sheets

(56) References Cited

U.S. PATENT DOCUMENTS

| | | | |
|---|---|---|---|
| 2015/0139212 A1* | 5/2015 | Wang | G01S 5/06 |
| | | | 370/338 |
| 2015/0293206 A1 | 10/2015 | Aldana | |
| 2016/0100287 A1 | 4/2016 | Thornycroft et al. | |
| 2016/0277197 A1 | 9/2016 | Jose et al. | |
| 2017/0188191 A1* | 6/2017 | Aldana | H04W 4/023 |
| 2018/0249437 A1* | 8/2018 | Lindskog | G01S 13/878 |
| 2019/0159161 A1 | 5/2019 | Kakani et al. | |
| 2020/0011963 A1 | 1/2020 | Handte et al. | |
| 2022/0030536 A1* | 1/2022 | Issakov | G01S 5/021 |
| 2022/0386214 A1* | 12/2022 | Kim | G01S 5/10 |

OTHER PUBLICATIONS

Krishna R., et al., "Calculating Relative Clock Drifts Using IEEE 802.11 Beacons", India Conference (INDICON), Annual IEEE, IEEE, Piscataway, NJ, USA, Dec. 18, 2009, pp. 1-4, XP031625283, p. 1-2, DOI: 10.1109/INDCON.2009.5409373 ISBN: 978-1-4244-4858-6.

* cited by examiner

ESTIMATING POSITION FROM REFERENCE SIGNALS RECEIVED BY COORDINATING ACCESS POINTS

TECHNICAL FIELD

The disclosure relates generally to communication networks and, more specifically but not exclusively, to estimating position from reference signals received by coordinating access points.

DESCRIPTION OF THE RELATED TECHNOLOGY

Wireless communications systems provide various types of communications, content, and service to people around the globe. These systems, which can support communications with multiple users by sharing the time, frequency, and spatial resources of a wireless medium, can include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). These multiple access technologies have been adopted in various telecommunication standards to provide a common protocol that enables different wireless devices to communicate on a municipal, national, regional, and even global level.

One example wireless communications standard is 5G NR, which is part of a continuous mobile broadband evolution promulgated by the Third Generation Partnership Project (3GPP) to meet new requirements associated with latency, reliability, security, scalability, and other requirements. Another example wireless communications standard is the IEEE 802.11 family of wireless communications standards, which governs the operation of wireless local area networks (WLANs), more commonly known as Wi-Fi networks. Various wireless devices can be used to perform location estimation within indoor and outdoor environments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

In some examples, systems and techniques are described for multicast tracing in hybrid networks.

Disclosed are systems, apparatuses, methods, computer readable medium, and circuits for identifying a location of a wireless device. According to at least one example, a method of a first access point (AP) for identifying a location of a wireless device includes transmitting a request message to the wireless device for identifying a position of the wireless device; receiving a response message from the wireless device; determining first time information based on a time of flight (ToF) of the request message and the response message, wherein the ToF corresponds to a distance of the wireless device from the AP; receiving a second message from a second AP that includes second time information associated with the request message and the response message; receiving a third message from a third AP that includes third time information associated with the request message and the response message; and transmitting location configuration information to the wireless device for the wireless device to determine a position of the wireless device.

In some aspects, a position of an object relative to network entities can be estimated using a reference signal. Estimating the position of an object relative to network entities can consume a significant amount of resources based on the identification of discrete distances between the objects due to the number of measurements that are required to minimize errors and improve accuracy. In some cases, location estimation can become infeasible due to high bandwidth use, for example, during a popular sporting event or other large gatherings.

Example Embodiments

The following description is directed to certain implementations for the purposes of describing innovative aspects of various embodiments. However, a person having ordinary skill in the art will readily recognize that the teachings herein can be applied in a multitude of different ways. The described implementations can be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

Examples are described herein in the context of systems and methods for location estimation based on broadcast and detection of broadcast by adjacent, coordinating devices. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

Location estimation refers to the ability of coordinating devices to identify a position of an object based on various measurements, such as ToF, angle of arrival (AoA), angle of departure (AoD), and other various similar measurements. Based on the various measurements at various devices, the location of an object can be identified. Previous location estimation techniques have limited accuracy to within several meters and limited use of techniques to larger objects such as vehicles, transit, and other outdoor environments. Location estimation can be useful in more scenarios when accuracy is improved and use cases are expanded to include indoor positioning. For example, a misplaced electronic device can be located when the accuracy is improved to decimeters or centimeters. More accurate location estimation has additional uses in many other industries, such as manufacturing, construction, food services, medical services, building automation, and so forth.

Location estimation can be implemented in wireless communication devices for various purposes, which is also referred to as fine tune measurement (FTM) for indoor and outdoor positioning, by using a round trip time (RTT) between two devices. The distance between the devices is half of the RTT divided by the speed of light or c, and a device can be positioned based on the determination of distances from multiple fixed locations. The accuracy of a single RTT is generally not very high due to noise, multipath, quantization error, drift, and other parasitic effects. Various techniques exist to improve the accuracy of the RTT determination, such as using AoA to determine phase information of a reference signal transmitted by the entity. One example of a technique to improve the accuracy of the RTT determination is by performing multiple RTT determinations at different frequencies to eliminate errors in RTT measurements.

Based on performing multiple frequency measurements for multiple network entities, location estimation can consume a significant amount of bandwidth, particularly if many people are performing location estimation within a constrained area. For example, it can not be possible to perform location estimation at a sporting event due to the significant bandwidth consumed by the participants performing typical communications. For example, the multiple frequencies can be blocked due to a busy communication channel and the frequency sweep can be non-contiguous and reduce the accuracy of RTT measurement techniques.

The subject technology relates to improving measurement techniques for location estimation. In one illustrative aspect, the method includes identifying a position of the wireless device; receiving a response message from the wireless device; determining first time information based on a ToF of the request message and the response message, wherein the ToF corresponds to a distance of the wireless device from the AP; receiving a second message from a second AP that includes second time information associated with the request message and the response message; receiving a third message from a third AP that includes third time information associated with the request message and the response message; and transmitting location configuration information to the wireless device for the wireless device to determine a position of the wireless device. As will be described in further detail, the coordinating (or adjacent) APs can be configured to listen for location measurements and report measurement information to an AP that initiates the location estimation.

Figure 1:
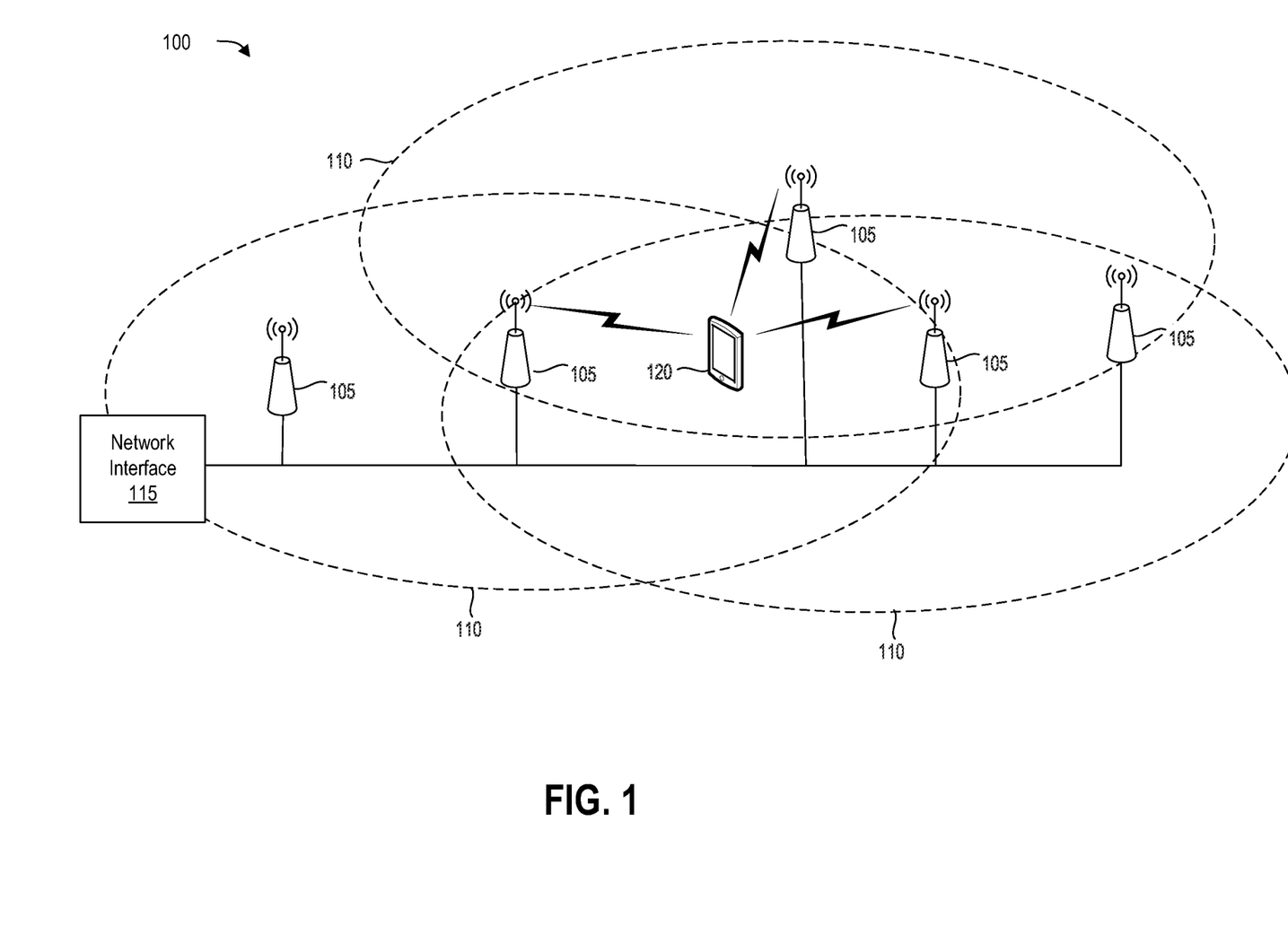
FIG. 1 illustrates an example of a network environment for estimating a location of an object in accordance with some aspects of the disclosure.

FIG. 1 illustrates an example of a network environment 100 for estimating a location of an object in accordance with some aspects of the disclosure. The network environment includes a plurality of APs 105 that are communicating with various devices within a corresponding transmission region 110 that corresponds to the geographic area the AP 105 can communicate within based on transmission power. Each AP 105 partially overlaps another AP 105 to ensure suitable geographic coverage of a region. An example of a region includes a building, a campus, or another configuration of indoor and/or outdoor space relating to an entity. For example, the network environment 100 can be a temporary network environment for a business meeting, a sports complex, and so forth.

Each AP 105 is connected to a network interface 115 via a backhaul interface (e.g., an Ethernet network) to connect to another network (e.g., a core network associated with a wireless carrier, a core network associated with a network provider, etc.) and each AP 105 can coordinate resources with other APs. For example, each AP 105 can automatically configure a channel based on neighboring AP to prevent interference in overlapping broadcast areas.

In one illustrative aspect, a user equipment (UE) 120 can be positioned to receive signals from a plurality of APs 105, which allow the UE 120 to benefit from location estimation services. For purposes of illustration, the UE 120 requests location estimation of itself, but the UE 120 can request location estimates of other objects, such as a UE, a tag capable of being tracked within the network environment 100, and so forth.

As illustrated in FIG. 1, a plurality of APs 105 can overlap and enable each AP 105 to listen to other APs. In some cases, each APs 105 can transmit a beacon (e.g., an 802.11k beacon) to identify other objects within the AP's respective transmission region 110. This allows the AP 105 to be informed of other devices and the transmission characteristics of the other devices to allow the AP 105 to configure its transmission parameters, such as a channel (e.g., an assigned block of frequencies for communication), transmission power, scheduling, and other information. When an AP 105 transmits a broadcast message to perform a location estimation function, the other APs within the transmission range can receive the signal. In some aspects further described below, the other APs, which are coordinating APs, can be configured to receive reference signals from an originating AP and the UE, and can report these measurements to the originating AP. The originating AP can determine the RTT with the UE from the coordinating APs to estimate the location of the UE 120.

Figure 2:
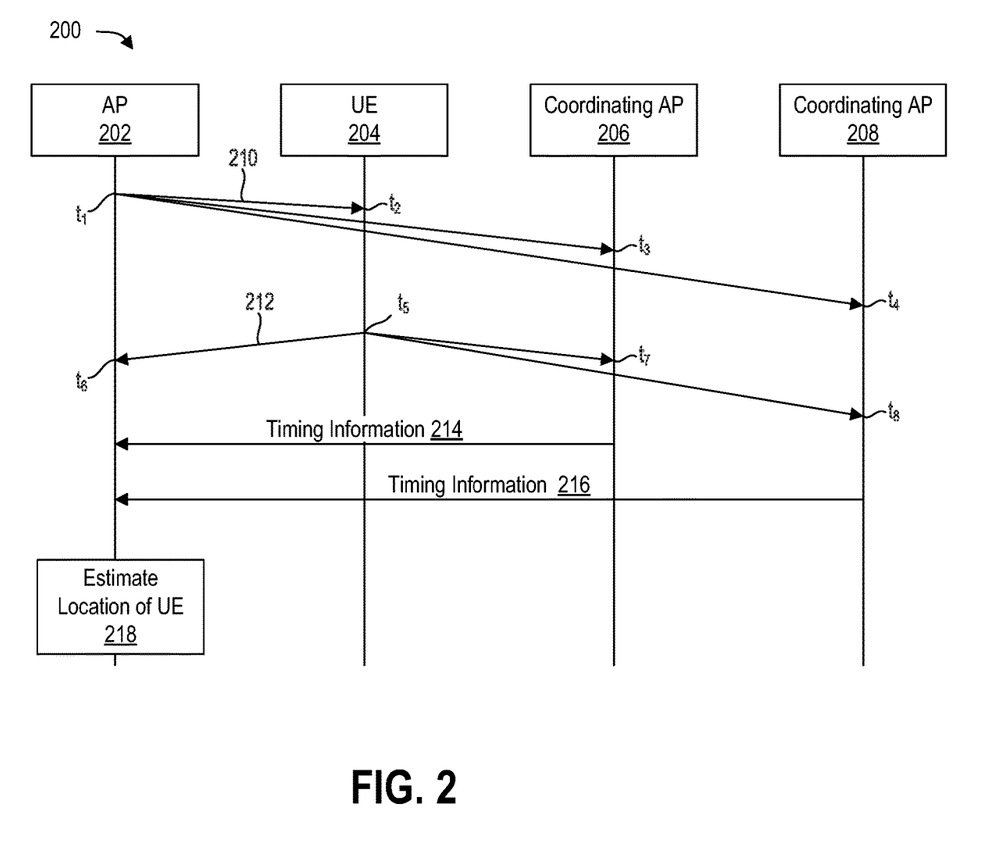
FIG. 2 illustrates a sequence diagram of a method for estimating a location of a user equipment (UE) in accordance with various aspects of the disclosure.

FIG. 2 illustrates a sequence diagram 200 of a method for estimating a location of a UE in accordance with various aspects of the disclosure. In one illustrative aspect, an AP 202 can be configured to estimate a location of a UE 204 that is within communication range for a first coordinating AP 206 and a second coordinating AP 208. Although the AP 202 is illustrated as estimating the location in FIG. 2, the estimation can also be performed by another network entity. Examples of another network entity that can estimate the location include an object tracking server that is located and connected to the AP 202, the first coordinating AP 206, and/or the second coordinating AP 208. The UE 204 can also be connected to the object tracking server, which can facilitate object detection within a fixed region. In one illustrative example, the AP 202, the first coordinating AP 206, and the second coordinating AP 208 can be synchronized in time with the object tracking server using a precision timing protocol (PTP) to reduce errors.

The AP 202 sends a reference signal 210, such as a FTM packet and includes time information (e.g., a timestamp) that identifies time $t_1$ at which the FTM packet is transmitted. The UE 204 receives the reference signal at time $t_1$. Because the first coordinating AP 206 and the second coordinating AP 208 are within the transmission range of the AP 202, the first coordinating AP 206 receives the reference signal at time $t_4$ and the second coordinating AP 208 receives the reference signal at time $t_4$. Although the times appear to be different in FIG. 2 for the purposes of clarity, some of the times can be similar based on their range from the AP 202, but the APs may be located in different directions. For example, the UE 204 and the first coordinating AP 206 can be identical distances away from the AP 202, but in different directions.

The UE 204, having received the reference signal, can transmit a reply message based on receiving the reference signal. One example of a reply message is an acknowledgment, which can also include a timestamp of its transmission time. For example, the UE 204 transmits an acknowledgment 212 at time $t_5$. Although the time $t_5$ is illustrated as after time $t_4$, the time $t_5$ can be any time after $t_2$. In one example, the time different between $t_2$ and $t_5$ is a delay associated with the UE 204 to process the reference signal 210 and then schedule and transmit the acknowledgment 212.

The first coordinating AP 206 and the second coordinating AP 208 are within the communication range of the UE 204 and receives the acknowledgment 212. For example, the first coordinating AP 206 receives the acknowledgment 212 at time $t_7$ and the second coordinating AP 208 receives the acknowledgment 212 at time $t_8$.

Although FIG. 2 illustrates a single reference signal 210 and a single acknowledgment 212, the setup of the location estimation (not shown) negotiates various parameters to ensure the location estimation is accurate. For example, the AP 202 and the UE 204 may need to negotiate a number of location estimations to perform, frequency (e.g., communication channel), timing, and other parameters. A detailed process to negotiate measurement parameters is omitted for clarity.

In some aspects, the first coordinating AP 206 and the second coordinating AP 208 can transmit timing information based on the measurements of the reference signal 210 and the acknowledgment 212 to the AP 202. As described below, the AP 202 (or other network entity) can use the time at which messages received by the first coordinating AP 206 and the second coordinating AP 208 to estimate a location of the UE 204. In some aspects, separate measurements by the first coordinating AP 206 and the second coordinating AP 208 can be omitted, which reduces bandwidth consumption, and increase the speed of the location estimation.

The AP 202 is able to determine the distance to the UE 204 based on the RTT of the reference signal 210 and the acknowledgment 212. For example, the AP 202 determines that the RTT is equal to $t_6-t_1+t_5-t_2$, which is the RTT less the delay at the UE 204 The distance between the AP 202 and the UE 204 is the RTT divided by two and divided by the speed of light c.

In some aspects, the AP 202 receives a timing information 214 from the first coordinating AP 206 and timing information 216 from the second coordinating AP 208. In some aspects, the timing information 214 includes the times at which the reference signal 210 and the acknowledgment 212 are received by the first coordinating AP 206, and the timing information 216 includes the times at which the reference signal 210 and the acknowledgment 212 are received by the second coordinating AP 208. In one aspect, the AP 202 can receive the timing information 214 and the timing information 218 using a backhaul (e.g., a wired network) that is used to coordinate various other functions, such as the PTP, handover, and other coordinating functions performed within the network environment.

Based on the timing information 214 and the timing information 216, the AP 202 can determine the distance to the UE 204. For example, the AP 202 receives timing information 214 can include time $t_7$, and the timing information 216 can include time $t_8$, which the AP 202 uses to determine a ToF from the UE 204 to the first coordinating AP 206 and a ToF from the UE 204 to the second coordinating AP 208. In one illustrative example, the timing information can include a plurality of reference signal measurements, and each measurement can include a frame number that is used to map transmission of reference signals (or acknowledgments) to the reception of the reference signals (or acknowledgments).

In another illustrative aspect, the location can be estimated by the UE 204. For example, the first coordinating AP 202 can transmit the timing information 214 and the timing information 216 to the UE 204. Based on the timing information 214 and the timing information 216, the UE 204 can determine the distance between the UE 204 and the first coordinating AP 206 and the distance between the AP 202 and the second coordinating AP 208. The distance from the UE 204 to the first coordinating AP 206 can be measured based on the ToF or based on the difference between time $t_7$ and time $t_5$. The distance from the AP 202 to the first coordinating AP 206 is also based on the ToF or based on the difference between time $t_8$ and time $t_5$. For example, the distance from the AP 202 and the first coordinating AP 206 corresponds to $(t_7-t_5)/(2\times c)$, and the distance from the AP 202 to the second coordinating AP 208 corresponds to $(t_8-t_5)/(2\times c)$. In this case, the UE 204 is aware of a distance between the AP 202, the first coordinating AP 206, and the second coordinating AP 208, and can determine its position. In some cases, the position is relative to the AP 202, the first coordinating AP 206, and the second coordinating AP 208. In some aspects, an absolute position can be determined based on location (e.g., the position of the AP 202, the first coordinating AP 206, or the second coordinating AP 208) that were provided or will be provided to the UE 204.

Based on the timing information 214 and the timing information 216, the AP 202 can determine the distance between the UE 204 and the first coordinating AP 206 and the distance between the AP 202 and the second coordinating AP 208. The distance from the UE 204 to the first coordinating AP 206 can be measured based on the ToF, or based on the difference between time $t_7$ and time $t_5$. The distance from the AP 202 to the first coordinating AP 206 is also based on the ToF, or based on the difference between time $t_8$ and time $t_5$. For example, the distance from the AP 202 and the first coordinating AP 206 corresponds to $(t_7-t_5)/(2\times c)$, and the distance from the AP 202 to the second coordinating AP 208 corresponds to $(t_8-t_5)/(2\times c)$.

In some aspects, each of the first coordinating AP 206 and the second coordinating AP 208 each provide a single packet on the backhaul network, and the packets can include a number of measurements. The reduces the number of transmissions and saves bandwidth during high bandwidth consumption events as described above (e.g., large sporting and entertainment events).

Although a single measurement is described above, the method can include a number of measurements to improve various errors, such as quantization errors and other similar issues based on minute time differences, clock drift, and other parasitic effects. The distances can be computed for each measurement and then average, or measurements can be averaged or a median value can be selected, to reduce the effects of parasitic and other intrinsic errors associated with the location estimations.

Figure 3:
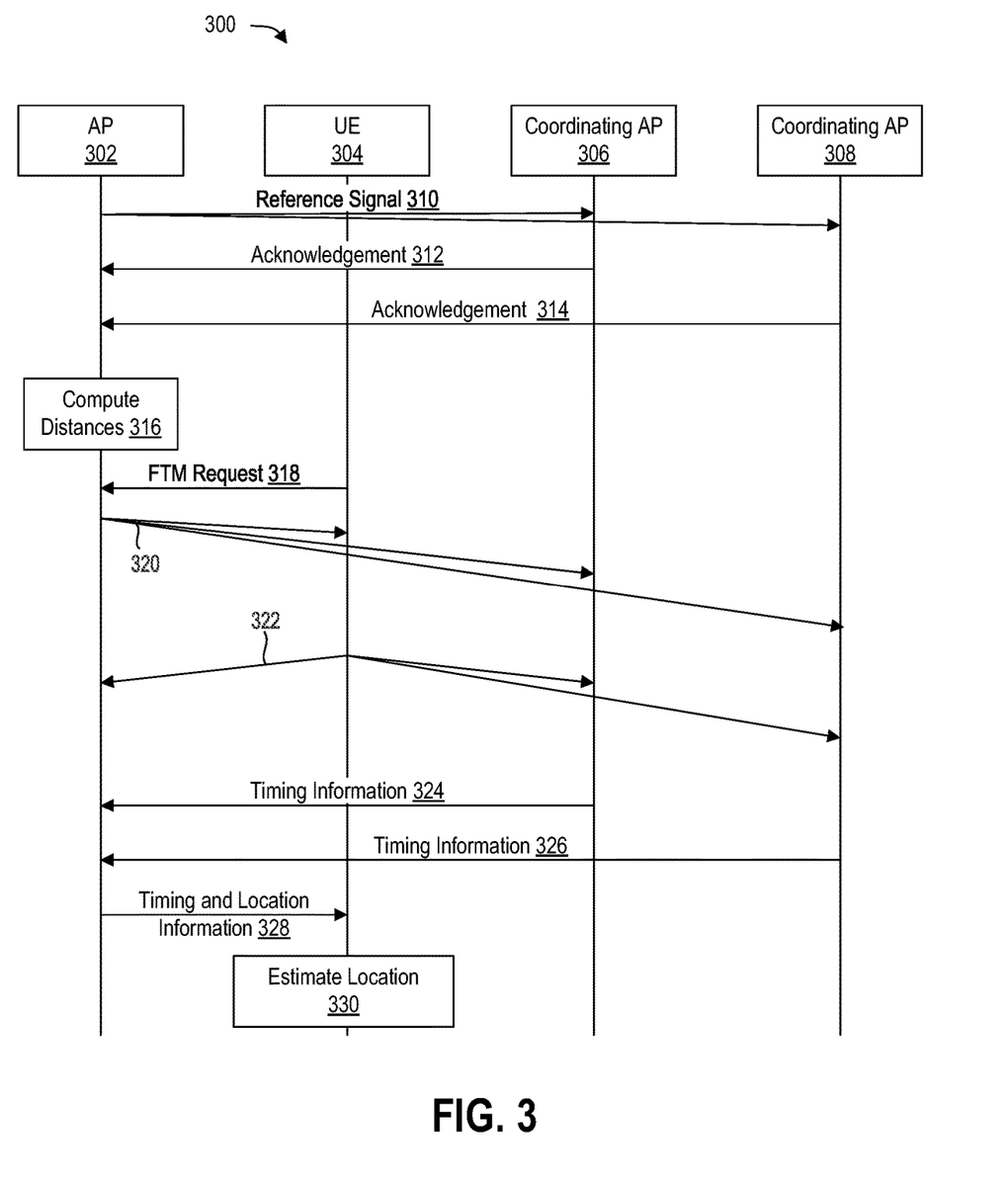
FIG. 3 illustrates a sequence diagram of another method for estimating a location of a UE in accordance with various aspects of the disclosure.

FIG. 3 illustrates a sequence diagram of another method for estimating a location of a UE in accordance with various aspects of the disclosure. In one illustrative aspect, a UE 304 is within communication range of an AP 302, a first coordinating AP 306 and a second coordinating AP 308. The UE 304 is configured to determine its location based on the RTT associated with the various transmissions while reducing consumed bandwidth. In one illustrative aspect, the AP 302, the first coordinating AP 306 and the second coordinating AP 308 can not be synchronized based on a timing protocol such as PTP.

In one illustrative aspect, the AP 302 can be configured to precompute distances associated with other devices that are within communication range, such as the first coordinating AP 306 and the second coordinating AP 308. For example, the AP 302 can transmit a FTM request using a reference signal 310, and the first coordinating AP 306 responds with an acknowledgment 312 and the second coordinating AP 308 responds with an acknowledgment 314. Based on the timestamps in the reference signal 310 and the acknowledgment 312, the AP 302 can precompute distances to the first coordinating AP 306 and the second coordinating AP 308 at block 316. In this case, the precomputing at block 316 can occur before the UE 304 is located within communication range of the AP 302.

In some aspects, the UE 304 can determine that a location of the UE 304 is requested. For example, a third party can request the location of the UE 304, and the UE 304 approves the request based on the identity or other information of the third party, and the UE 304 can send a FTM request to the AP 302. For example, the UE 304 can be connected to the AP 302 based on signal strength, and other favorable wireless characteristics. In response, the AP 302 broadcasts the reference signal 320 to the UE 304. The reference signal 320 is received by the first coordinating AP 306 and the second coordinating AP 308 as described above. The UE 304 responds with an acknowledgment 322, which is also received by the first coordinating AP 306 and the second coordinating AP 308.

The reference signal 320 and the acknowledgment 322 timings are similar to the reference signal 210 and the acknowledgment 212 timings described above with reference to FIG. 2. Description of the reference signal 320 and acknowledgment 322 will be omitted to avoid repetitive descriptions.

The first coordinating AP 306 can transmit timing information 324 to the AP 302 and the second coordinating AP 308 can transmit timing information 326 to the AP 302. In the illustrated example, the first coordinating AP 306 and the second coordinating AP 308 do not use a timing reference such as the PTP protocol, and deviation can affect timing calculations. In some aspects, the various APs are generally stationary and preferably hidden, either in an inconspicuous location or placed in a location where its visibility is hidden (e.g., in an electrical storage closet). That is, the AP is generally in a fixed location and the AP 302 can be configured to adjust the timing information as it does not regularly move. For example, if the AP 302 previously determines that the first coordinating AP 306 is 3 meters away, the AP 302 can adjust the timing information by 10 nanoseconds (e.g., 3 meters at the speed of light). Based on the timing information, the AP 302 calibrates the first coordinating AP 306 can transmit timing information 324 and the second coordinating AP 308 can transmit timing information 326 and sends timing information and location information 328 to the AP 302. For example, the location information can include locations of various devices, such as the AP 302, the first coordinating AP 306, and the second coordinating AP 308. At block 330, the UE 304 computes its location based on the timing and location information 328.

Figure 4:
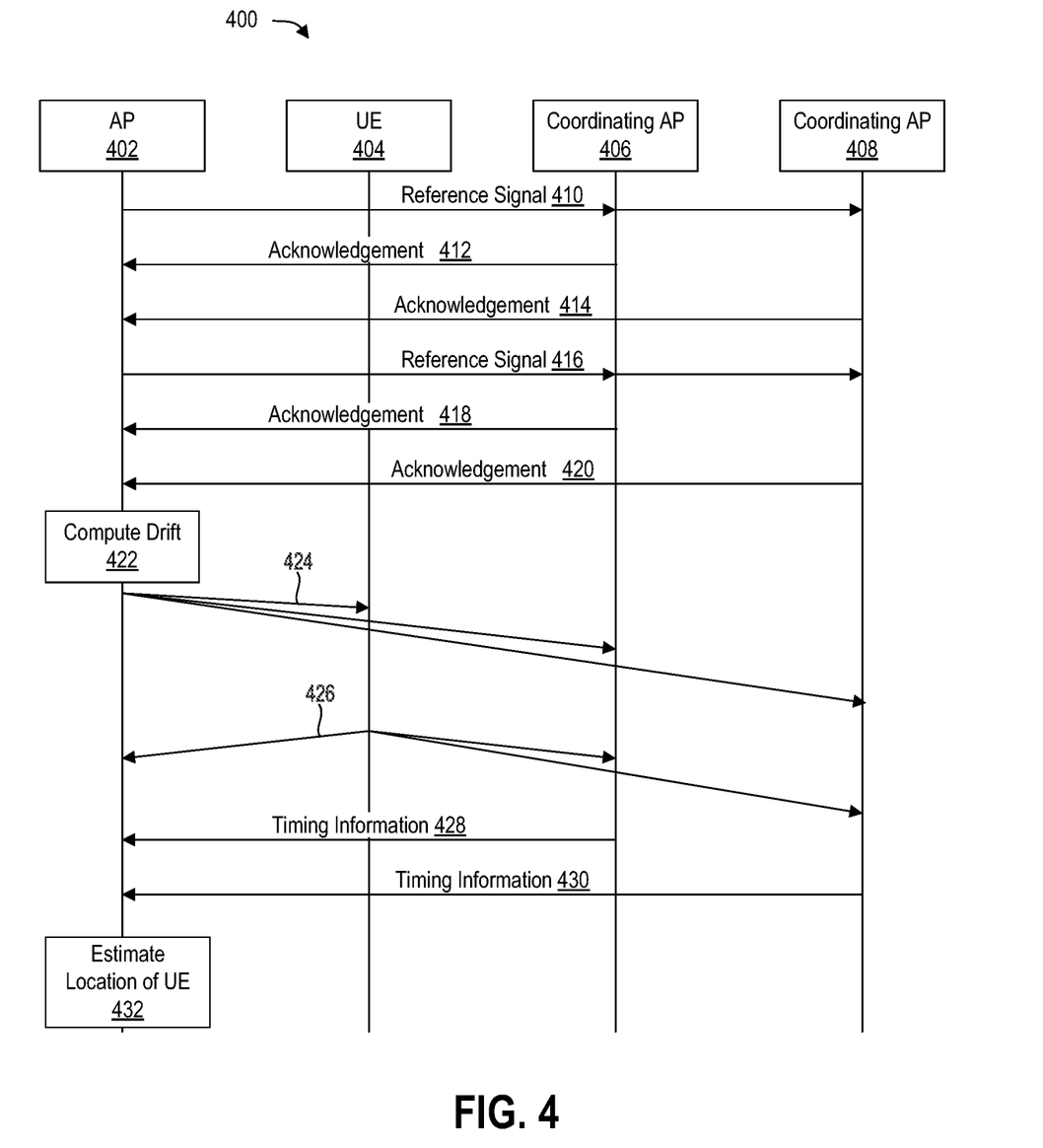
FIG. 4 illustrates a sequence diagram of another method for estimating a location of a UE in accordance with various aspects of the disclosure.

FIG. 4 illustrates a sequence diagram of another method for estimating a location of a UE in accordance with various aspects of the disclosure. In the aspect illustrated in FIG. 4, a UE 404 is within communication range of an AP 402, a first coordinating AP 406 and a second coordinating AP 408, and the UE 404 is connected to the AP 402. The AP 402 provides a reference signal 410 to the first coordinating AP 406 and the second coordinating AP 408 to measure an RTT and compute a distance. The first coordinating AP 406 provides an acknowledgment 412 and the second coordinating AP 408 provides an acknowledgment 414, each with time information that the AP 402 can use to compute clock drift.

For example, the AP 402, the first coordinating AP 406, and the second coordinating AP 408 provide timestamps that include measurements in nanoseconds. In this case, the accuracy of the location estimations is improved and the APs do not need to be synchronized, but drift associated with a clock will be more prevalent due to the clock intervals and can affect measurements.

After a period of time sufficient to identify a clock drift, the AP 402 can request another FTM via reference signal 416, and the first coordinating AP 406 and the second coordinating AP 408 respond with acknowledgments 418 and 420. In some aspects, although two measurements are illustrated, the AP 402 can perform a large number of measurements, particularly during off-peak hours or when network utilization is low. At block 422, the AP 402 computes a clock drift for each AP, that is a clock drift for the first coordinating AP 406 and a clock drift for the second coordinating AP 408. In some aspects, the nanosecond-level accuracy can need to be compensated due to minor variations in the clock (e.g., clock drift) that can cause RTT measurements to vary.

In some cases, the AP 402 can receive an instruction to identify a location of the UE 404 from another network device. Based on the instruction, the AP 402 can provide a reference signal 424 to initiate a FTM and the AP 402 receives the acknowledgments 426 as further described above with reference to FIGS. 2 and 3. The AP 402 can also receive the timing information 428 and the timing information 430 with the corresponding timestamps discussed above in FIG. 2. In this case, the AP 402, the first coordinating AP 406, and the second coordinating AP 408 are not synchronized with a timing protocol, but the nanosecond intervals of the timestamps can be used by the AP 402 to determine an accurate location. In this case, the AP 402 estimates the positions of the UE 432 based on adjusting the timing information using the drift associated with the first coordinating AP 406 and the drift associated with the second coordinating AP 408.

Figure 5:
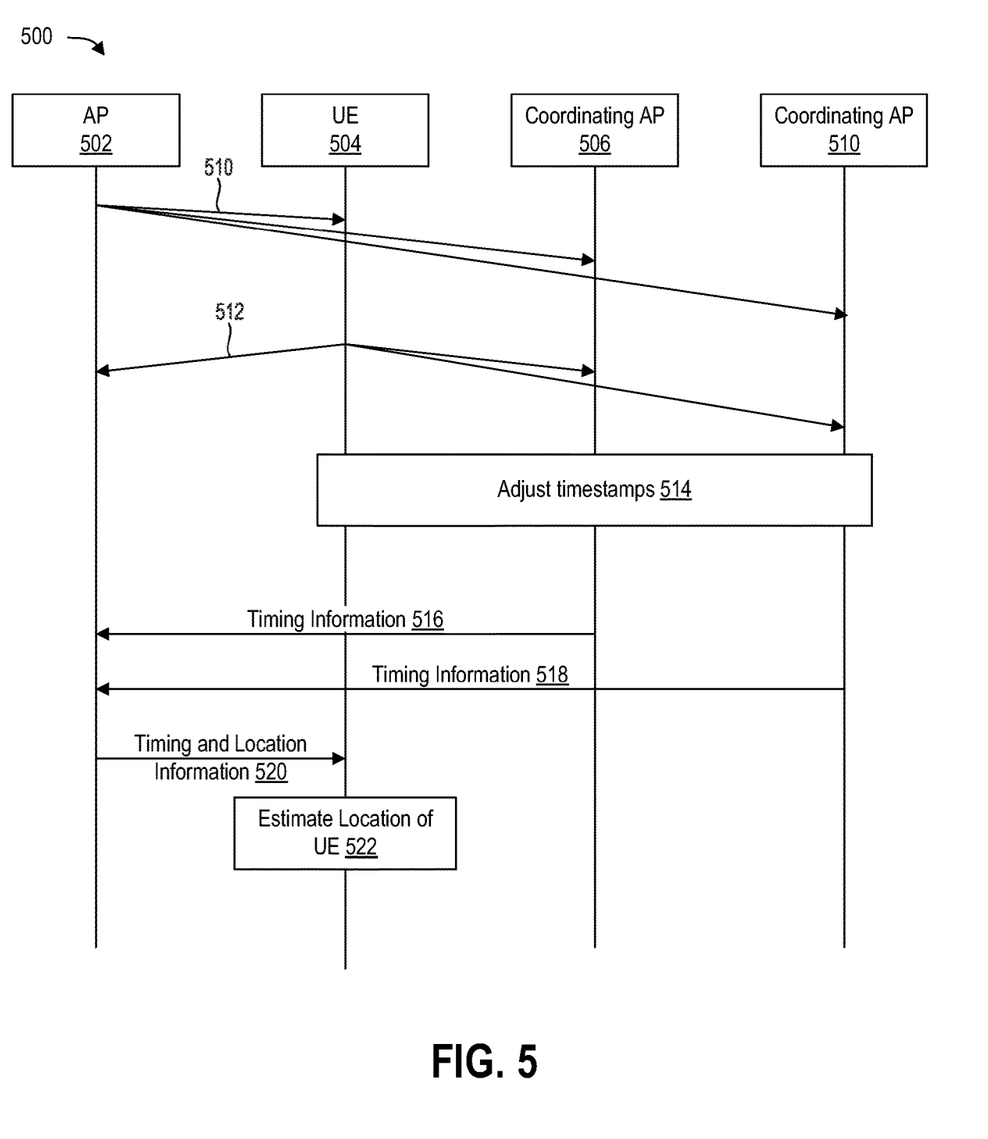
FIG. 5 illustrates a sequence diagram of another method for estimating a location of a UE in accordance with various aspects of the disclosure.

FIG. 5 illustrates a sequence diagram of another method for estimating a location of a UE in accordance with various aspects of the disclosure. In the aspect illustrated in FIG. 5, a UE 504 is within the communication range of an AP 502, a first coordinating AP 506 and a second coordinating AP 508, and the UE 504 is connected to the AP 502.

In this aspect, the AP 502 provides a reference signal 510 to the UE 504 to measure its location, and the reference signal 510 is received by the first coordinating AP 506 and the second coordinating AP 508. In this case, the reference signal 510 includes a timestamp that identifies its transmission time. As further described below, the timestamp is used to adjust timing information to ensure a stable time reference.

The UE 504 is configured to transmit an acknowledgment 512 as described above. The acknowledgment 512 can include a timestamp that is based on the timestamp in the reference signal 510, to ensure that the first coordinating AP 506 and the second coordinating AP 508 are using the same time reference. At block 514, the first coordinating AP 506 and the second coordinating AP 508 can each adjust the timestamps in the reference signal 510 and the acknowledgment 512 and then report timing information 516 and 518, respectively.

The AP 502 can provide timing and location information 520 to the UE 504, which then estimates its location at block 522. In this aspect, a UE can compute its distance to multiple APs with a much simpler choreography than standard FTM, thus reducing the consumed airtime and bandwidth. This is important in high-density areas where many clients can need location values, but the frequency band is too crowded for each UE to get the opportunity for full FTM exchanges.

Figure 6:
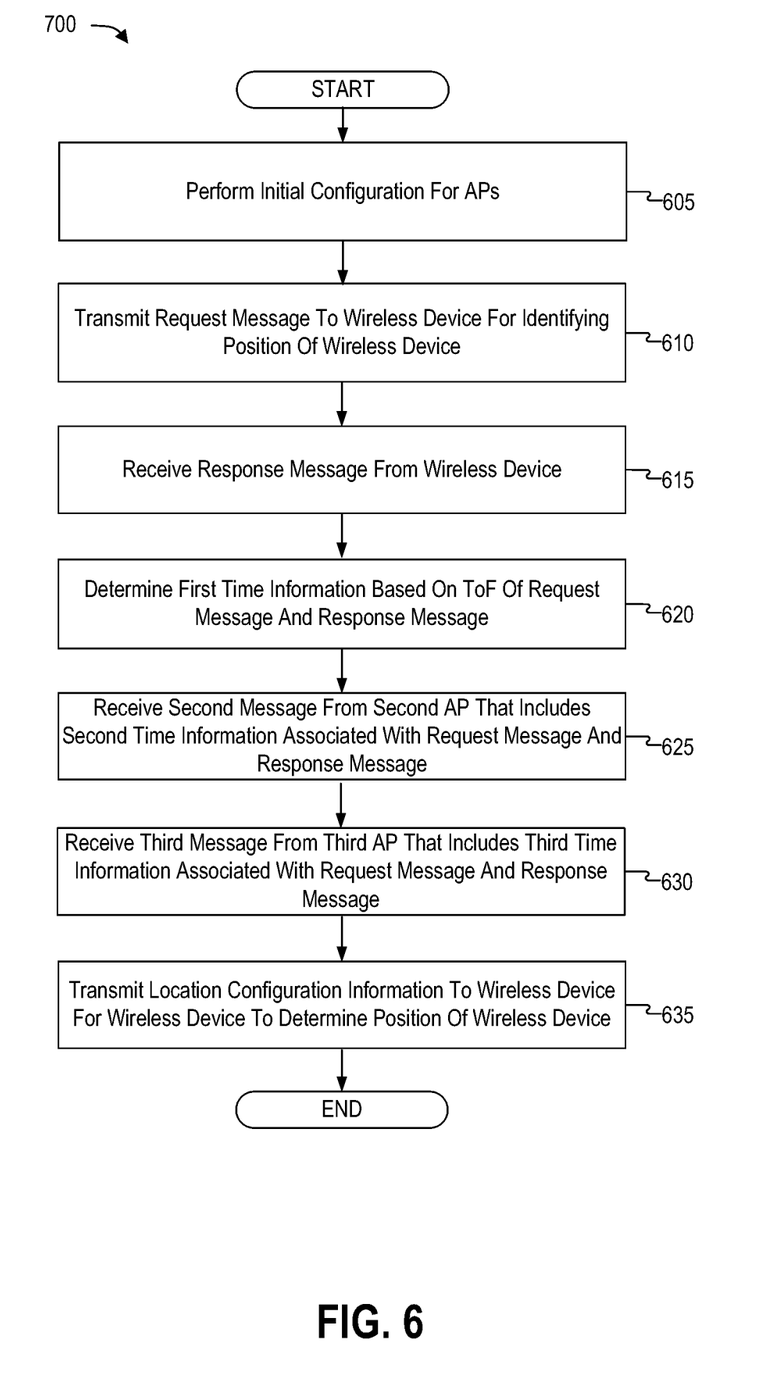
FIG. 6 illustrates an example method 600 that can be performed by an access point (AP) for estimating a location of an object in accordance with some aspects of the disclosure.

FIG. 6 illustrates an example method 600 that can be performed by an AP for estimating a location of an object in accordance with some aspects of the disclosure. Although the example method 600 depicts a particular sequence of operations, the sequence can be altered without departing from the scope of the present disclosure. For example, some of the operations depicted can be performed in parallel or in a different sequence that does not materially affect the function of the method 600. In other examples, different components of an example device or system that implements the method 600 can perform functions at substantially the same time or in a specific sequence.

In one illustrative aspect, the method can be performed by an AP, such as the AP 202, the AP 302, the AP 402, and the AP 502. However, in some aspects, the method can be partially performed by another device, such as a cloud server or a local server (e.g, a device tracking server).

According to some examples, the AP performing an initial configuration at block 605. In one illustrative aspect, the initial configuration is related to setting up a timing protocol. This allows the first AP, the second AP, and the third AP to be synchronized via a timing protocol (e.g., PTP) via the backhaul network connection. In another illustrative aspect, the the AP can precompute distances to the coordinating APs. For example, the AP can determine a first distance to the first AP and a second distance to the second AP at block

605. When the AP receives the timing information, further described above with reference to FIG. 3, the AP can subtract a first predetermined time offset from the second time information based on a distance from the first AP to the second AP. The first predetermined time offset corresponds to the first distance. The AP can also subtract a second predetermined time offset from the third time information based on a distance from the first AP to the third AP. The second predetermined time corresponds to the second distance.

In another illustrative aspect, the initial configuration can be related to determining a drift when the APs are capable of timestamps that use units of nanoseconds. In this case, the AP can receive a plurality of beacons transmitted from the second AP. At least some beacons of the plurality of beacons include a timestamp with nanosecond accuracy. This process can occur multiple times and allow the AP can identify a clock drift associated with the second AP based on time information identified in the plurality of beacons.

At block 610, the AP can transmit a request message to the wireless device for identifying a position of the wireless device. In some cases, the AP can receive a request from an external device or from the wireless device to estimate a location of the wireless device. In one example, the request message can have a timestamp, and the second AP, the third AP, and the wireless device can use the timestamp as a reference clock. As described above, the request message is also received by the coordinating APs, or the second AP and the third AP described above.

At block 615, the AP can receive a response message from the wireless device. The second AP and the third AP can also receive the response message at various times, as described above. Based on the response message, the AP can determine first time information based on a ToF of the request message and the response message. The ToF corresponds to a distance of the wireless device from the AP.

At block 625, the AP can receive a second message from the second AP that includes second time information associated with the request message and the response message. In one illustrative example, although only a reference signal (e.g., an FTM) and a single response (e.g., an acknowledgment) is illustrated, the AP and the second AP can exchange several messages to improve measurement accuracy. In this case, the second message can include all timing information, and the timing information can be mapped to reference signals based on a frame identifier, for example. The AP can use the information to determine ToF from the wireless device to the other APs as described above. In one example, the second message is received by the AP on a backhaul network connection. However, the second message can be transmitted over a wireless communication interface.

At block 630, the AP can receive a third message from a third AP that includes third time information associated with the request message and the response message. In one example, the third message is received by the AP on a backhaul network connection. However, the third message can be transmitted over a wireless communication interface.

In one illustrative aspect, the timing information provided by the wireless device, the second AP and the third AP is based on a timestamp sent by the AP. In this case, the wireless device, the second AP, and the third AP use the timestamp from the AP as a reference clock, and can adjust the timestamps and/or time durations represented in the timing information.

At block 635, the AP can transmit location configuration information to the wireless device for the wireless device to determine a position of the wireless device. The location configuration information can include position information associated with the various AP, and the wireless device computes a round trip time from the wireless device to the second AP and a round trip time to the third AP. Based on the round trip time of the various APs and the location configuration information, the wireless device can identify a position. Although the wireless device (e.g., the UE 204, etc.) is described as estimating the location, the AP can estimate the location, or another network entity can estimate the location.

Figure 7:
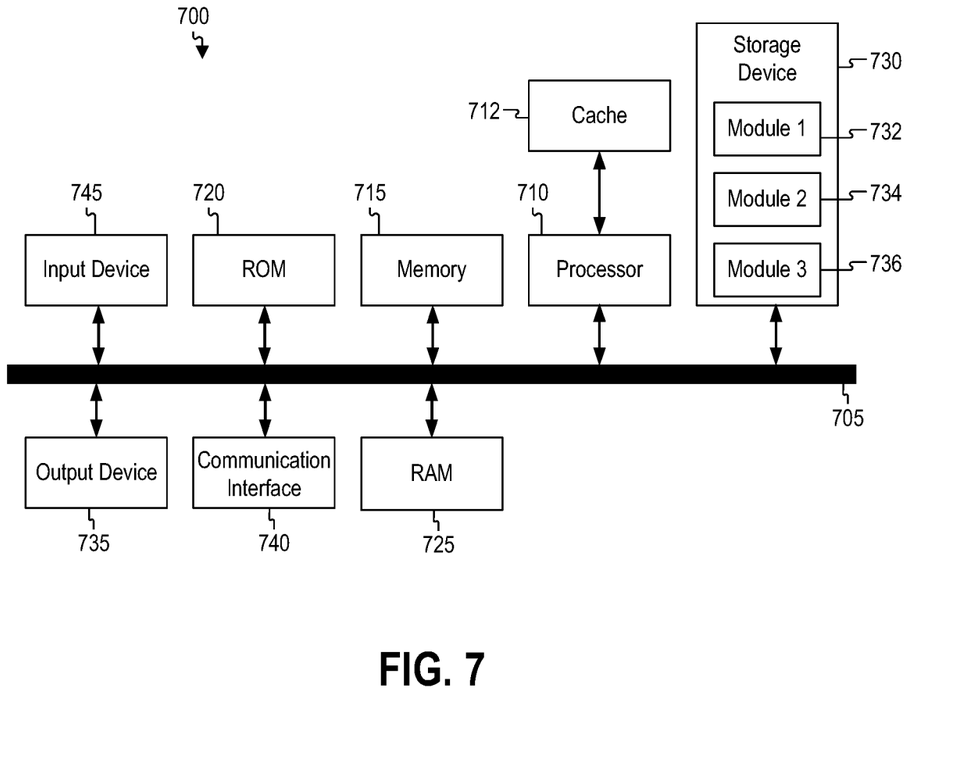
FIG. 7 shows an example of computing system, which can be for example any computing device that can implement components of the system.

FIG. 7 shows an example of computing system 700, which can be for example any computing device making up the various roles described above or any component thereof in which the components of the system are in communication with each other using connection 705. Connection 705 can be a physical connection via a bus, or a direct connection to processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 can essentially be a completely self-contained computing system, containing multiple cores or processors, a bus, memory controller, cache, etc. A multi-core processor can be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here can easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Figure 8:
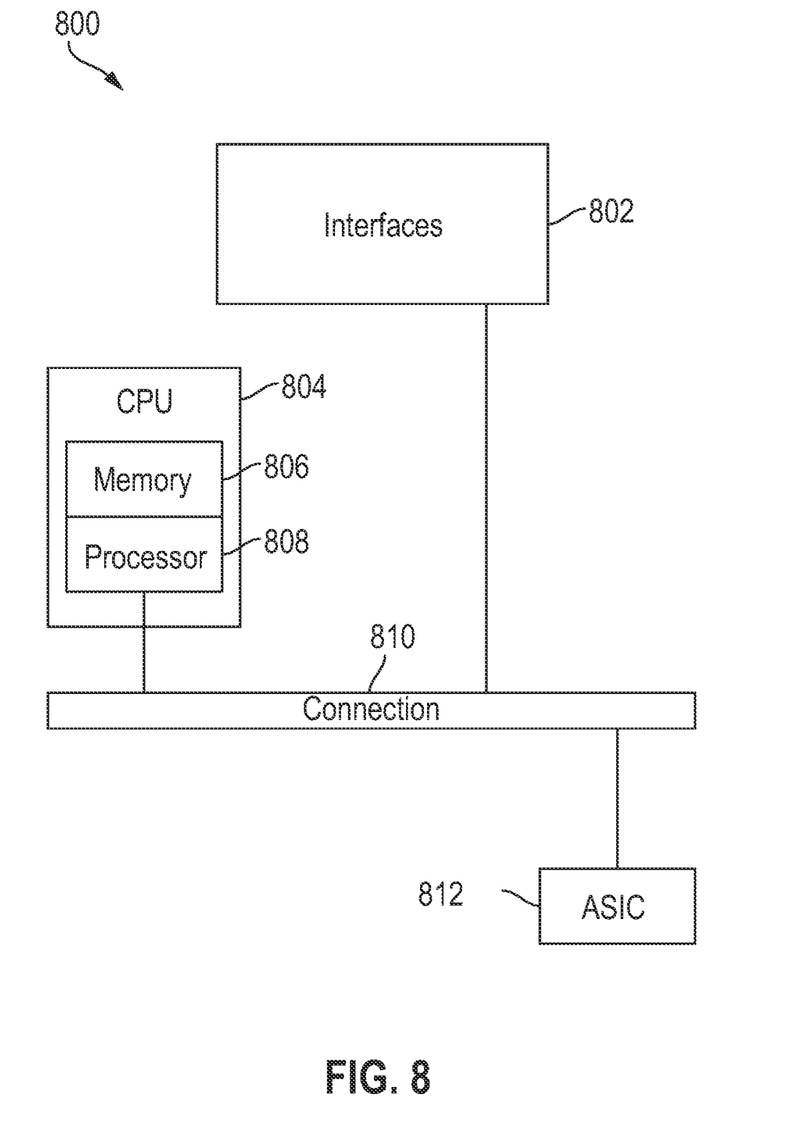
FIG. 8 illustrates an example network device in accordance with some examples of the disclosure.

FIG. 8 illustrates an example network device 800 suitable for performing switching, routing, load balancing, and other networking operations. The example network device 800 can be implemented as switches, routers, nodes, metadata servers, load balancers, client devices, and so forth.

Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 can include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, asynchronous transfer mode (ATM) interfaces, HSSI interfaces, POS interfaces, FDDI interfaces, WIFI interfaces, 3G/4G/5G cellular interfaces, CAN BUS, LoRA, and the like. Generally, these interfaces can include ports appropriate for communication with the appropriate media. In some cases, they can also include an independent processor and, in some instances, volatile RAM. The independent processors can control such communications intensive tasks as packet switching, media control, signal processing, crypto processing, and management. By providing separate processors for the communication intensive tasks, these interfaces allow the master CPU (e.g., 804) to efficiently perform routing computations, network diagnostics, security functions, etc.

Although the system shown in FIG. 8 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 800.

Regardless of the network device's configuration, it can employ one or more memories or memory modules (including memory 806) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the bus 810, to exchange data and signals and coordinate various types of operations by the network device 800, such as routing, switching, and/or data storage operations, for example.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

For clarity of explanation, in some instances, the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method of a first AP for identifying a location of a wireless device, comprising: transmitting a request message to the wireless device for identifying a position of the wireless device; receiving a response message from the wireless device; determining first time information based on a ToF of the request message and the response message, wherein the ToF corresponds to a distance of the wireless device from the AP; receiving a second message from a second AP that includes second time information associated with the request message and the response message; receiving a third message from a third AP that includes third time information associated with the request message and the response message; and transmitting location configuration information to the wireless device for the wireless device to determine the position of the wireless device.

Aspect 2. The method of Aspect 1, further comprising: subtracting a first predetermined time offset from the second time information based on a distance from the first AP to the second AP; and subtracting a second predetermined time offset from the third time information based on a distance from the first AP to the third AP.

Aspect 3. The method of any of Aspects 1 to 2, further comprising determining a first distance to the first AP and a second distance to the second AP.

Aspect 4. The method of any of Aspects 1 to 3, wherein the first predetermined time offset corresponds to the first distance, and wherein the second predetermined time corresponds to the second distance.

Aspect 5. The method of any of Aspects 1 to 4, further comprising: receiving a plurality of beacons transmitted from the second AP; and identifying a clock drift associated with the second AP based on time information identified in the plurality of beacons.

Aspect 6. The method of any of Aspects 1 to 5, wherein at least some beacons of the plurality of beacons include a timestamp with nanosecond accuracy.

Aspect 7. The method of any of Aspects 1 to 6, wherein at least one of the second message and the third message are received on a backhaul network connection.

Aspect 8. The method of any of Aspects 1 to 7, wherein the first AP, the second AP, and the third AP are synchronized via a timing protocol via a backhaul network connection.

Aspect 9. The method of any of Aspects 1 to 8, wherein the wireless device computes a round trip time from the wireless device to the second AP and a round trip time to the third AP to determine the position.

Aspect 10. The method of any of Aspects 1 to 9, wherein the request message includes a timestamp, and wherein the second AP, the third AP, and the wireless device use the timestamp as a reference clock.

Aspect 11. A first access point (AP) for providing location estimation information, comprising: a storage configured to store instructions; a processor configured to execute the instructions and cause the processor to: transmit a request message to a wireless device for identifying a position of the wireless device; receive a response message from the wireless device; determine first time information based on a time of flight (ToF) of the request message and the response message, wherein the ToF corresponds to a distance of the wireless device from the AP; receive a second message from a second AP that includes second time information associated with the request message and the response message; receive a third message from a third AP that includes third time information associated with the request message and the response message; and transmit location configuration information to the wireless device for the wireless device to determine a position of the wireless device.

Aspect 12. The first AP of Aspect 11, wherein the processor is configured to execute the instructions and cause the processor to: subtract a first predetermined time offset from the second time information based on a distance from the first AP to the second AP; and subtract a second predetermined time offset from the third time information based on a distance from the first AP to the third AP.

Aspect 13. The first AP of any of Aspects 11 to 12, wherein the processor is configured to execute the instructions and cause the processor to: determine a first distance to the first AP and a second distance to the second AP.

Aspect 14. The first AP of any of Aspects 11 to 13, wherein the first predetermined time offset corresponds to the first distance, and wherein the second predetermined time corresponds to the second distance.

Aspect 15. The first AP of any of Aspects 11 to 14, wherein the processor is configured to execute the instructions and cause the processor to: receive a plurality of beacons transmitted from the second AP; and identify a clock drift associated with the second AP based on time information identified in the plurality of beacons.

Aspect 16. The AP of any of Aspects 11 to 15, wherein at least some beacons of the plurality of beacons include a timestamp with nanosecond accuracy.

Aspect 17. The first AP of any of Aspects 11 to 16, wherein at least one of the second message and the third message are received on a backhaul network connection.

Aspect 18. The first AP of any of Aspects 11 to 17, wherein the first AP, the second AP, and the third AP are synchronized via a timing protocol via a backhaul network connection.

Aspect 19. The first AP of any of Aspects 11 to 18, wherein the wireless device computes a round trip time from the wireless device to the second AP and a round trip time to the third AP to determine the position.

Aspect 20. The first AP of any of Aspects 11 to 19, wherein the request message includes a timestamp, and wherein the second AP, the third AP, and the wireless device use the timestamp as a reference clock.

Aspect 21. A non-transitory computer-readable medium comprising instructions which, when executed by one or more processors, cause the one or more processors to perform operations according to any of Aspects 1 to 10.

Aspect 22. An apparatus comprising means for performing operations according to any of Aspects 1 to 10.

What is claimed is:

1. A method of a first access point (AP) for identifying a location of a wireless device, comprising:
transmitting a first reference signal to a second AP and a third AP to measure a round trip time and compute a distance;
receiving a first acknowledgment message from each of the second AP and the third AP including at least time information from the respective AP;
after a period of time subsequent to receiving the first acknowledgement message, transmitting a second reference signal to the second AP and the third AP;
receiving a second acknowledgment message from each of the second AP and the third AP;
for each the second AP and the third AP, calculating a clock drift using the first acknowledgment message and the second acknowledgment message, respectively;
transmitting a request message to the wireless device for identifying a position of the wireless device;
receiving a response message from the wireless device;
determining first time information based on a time of flight (ToF) of the request message and the response message, wherein the ToF corresponds to a distance of the wireless device from the AP;
receiving a second message from the second AP that includes second time information associated with the request message and the response message;
receiving a third message from the third AP that includes third time information associated with the request message and the response message; and
estimating a location of the wireless device based at least on the second time information, the third time information and adjusting the second and third timing information using the clock drift associated with the second AP and the third AP.

2. The method of claim 1, further comprising:
subtracting a first predetermined time offset from the second time information based on a distance from the first AP to the second AP; and
subtracting a second predetermined time offset from the third time information based on a distance from the first AP to the third AP.

3. The method of claim 2, further comprising determining a first distance to the first AP and a second distance to the second AP.

4. The method of claim 3, wherein the first predetermined time offset corresponds to the first distance, and wherein the second predetermined time corresponds to the second distance.

5. The method of claim 1, further comprising:
receiving a plurality of beacons transmitted from the second AP; and
identifying a clock drift associated with the second AP based on time information identified in the plurality of beacons.

6. The method of claim 5, wherein at least some beacons of the plurality of beacons include a timestamp with nanosecond accuracy.

7. The method of claim 1, wherein at least one of the second message and the third message are received on a backhaul network connection.

8. The method of claim 1, wherein the first AP, the second AP, and the third AP are synchronized via a timing protocol via a backhaul network connection.

9. The method of claim 1, wherein the wireless device computes a round trip time from the wireless device to the second AP and a round trip time to the third AP to determine the position.

10. The method of claim 1, wherein the request message includes a timestamp, and wherein the second AP, the third AP, and the wireless device use the timestamp as a reference clock.

11. A first access point (AP) for providing location estimation information, comprising:
a storage configured to store instructions;
a processor configured to execute the instructions and cause the processor to:
transmit a first reference signal to a second AP and a third AP to measure a round trip time and compute a distance;
receive a first acknowledgment message from each of the second AP and the third AP including at least time information from the respective AP;
after a period of time subsequent to receiving the first acknowledgement message, transmit a second reference signal to the second AP and the third AP;
receive a second acknowledgment message from each of the second AP and the third AP;
for each the second AP and the third AP, calculate a clock drift using the first acknowledgment message and the second acknowledgment message, respectively;
transmit a request message to a wireless device for identifying a position of the wireless device;
receive a response message from the wireless device;
determine first time information based on a time of flight (ToF) of the request message and the response message, wherein the ToF corresponds to a distance of the wireless device from the AP;
receive a second message from the second AP that includes second time information associated with the request message and the response message;
receive a third message from the third AP that includes third time information associated with the request message and the response message; and
estimate a location of the wireless device based at least on the second time information, the third time information and adjusting the second and third timing information using the clock drift associated with the second AP and the third AP.

12. The first AP of claim 11, wherein the processor is configured to execute the instructions and cause the processor to:
subtract a first predetermined time offset from the second time information based on a distance from the first AP to the second AP; and
subtract a second predetermined time offset from the third time information based on a distance from the first AP to the third AP.

13. The first AP of claim 12, wherein the processor is configured to execute the instructions and cause the processor to: determine a first distance to the first AP and a second distance to the second AP.

14. The first AP of claim 13, wherein the first predetermined time offset corresponds to the first distance, and wherein the second predetermined time corresponds to the second distance.

15. The first AP of claim 11, wherein the processor is configured to execute the instructions and cause the processor to:
receive a plurality of beacons transmitted from the second AP; and
identify a clock drift associated with the second AP based on time information identified in the plurality of beacons.

16. The AP of claim 15, wherein at least some beacons of the plurality of beacons include a timestamp with nanosecond accuracy.

17. The first AP of claim 11, wherein at least one of the second message and the third message are received on a backhaul network connection.

18. The first AP of claim 11, wherein the first AP, the second AP, and the third AP are synchronized via a timing protocol via a backhaul network connection.

19. The first AP of claim 11, wherein the wireless device computes a round trip time from the wireless device to the second AP and a round trip time to the third AP to determine the position.

20. The first AP of claim 11, wherein the request message includes a timestamp, and wherein the second AP, the third AP, and the wireless device use the timestamp as a reference clock.

* * * * *